Patented Feb. 8, 1944

2,341,425

UNITED STATES PATENT OFFICE 2,341,425

METHOD OF PRODUCING SKIMMED MILK COLLOID

Clayton Clifford Curry, Wilmington, Del., assignor to Research and Development Corporation, Wilmington, Del., a corporation of Delaware No Drawing. Application March 22, 1941, Serial No. 384,703

17 Claims. (Cl. 99—54)

This invention relates to skimmed milk colloid, and more particularly deals with an improved method of producing a skimmed milk colloid which is of particular value as an emulsifying agent in the preparation of emulsions of fats and oils suitable for edible, culinary and other purposes. For example, the skimmed milk colloid of my invention is an excellent emulsifying agent for butter, lard, and other animal fats such as edible tallow; for vegetable oily substances such as cottonseed, olive, coconut, peanut and other oils and nut fats; and for mixtures of animal and vegetable oily substances of the character described. Another use of the skimmed milk colloid of my invention is in the manufacture of ice cream, where it serves to prevent the formation of ice crystals and may be substituted in part or entirely for milk solids generally used in the manufacture of ice cream.

The colloid of my invention may be prepared from the "skim milk" of commerce or from so-called "modified milk"; that is to say, from milk from which a substantial proportion of the butterfat has been removed or "skimmed." Either concentrated or thickened skimmed milk, or skimmed milk powder obtained by either the spray or the roller process, may be used successfully in carrying out my invention. By concentrated or thickened skimmed milk is meant skimmed milk the water content of which has been reduced to from 50 to 75% more or less.

The object of my invention is to provide a rapid method of producing the skimmed milk colloid herein described. Hitherto it has been necessary to store or "age" the skimmed milk at one or more stages of its treatment for converting it into a skimmed milk colloid. Methods hitherto employed have required detention periods ranging up to 24 hours or more at temperatures of about 10° C., and as a consequence a large amount of costly equipment has been necessarily tied up, and substantial tonnage of refrigeration has had to be provided for and used. I have found that aging may be dispensed with without affecting the quality or characteristics of the finished products.

By way of example, I shall now describe the procedure followed by me in the preparation of the colloid of my invention in a specific instance:

20 kilos of skimmed milk powder were mixed with 50 kilos of water. The mixture was thoroughly agitated until all of the powder had dissolved. Then there was added to the mixture (while the mixture was being agitated) sufficient tetrasodium pyrophosphate dissolved in a minimum amount of water to give the mixture the consistency of a stiff pudding. In the instant example the amount of tetrasodium pyrophosphate required to bring this about was approximately 1¼ kilos. The mixture was stirred continuously until it attained a homogeneous state, whereupon there was added to it (while still agitating it) an acid solution consisting of approximately 200 grams of sodium acid phosphate, 200 grams of common table salt and sufficient citric acid in 1600 cc. of water to give a pH value of 3. Agitation was continued until the entire mass was well mixed, and it was then gradually heated on a water-bath to a temperature of about 60–65 ° C. The mixture was held at that temperature, in a covered vessel and with occasional stirring, for approximately 2 hours. Thereafter the mixture was neutralized by the addition of sufficient sodium carbonate dissolved in a minimum amount of water to give a final pH value of approximately 7.0 and the temperature increased and held at approximately 75–80° C. for approximately 2 hours. During this secondary heating period the vessel was left uncovered and the mass was thoroughly stirred to insure complete neutralization. The mass was then cooled to room temperature and then stored at about 50° F. until used.

It will be understood by those skilled in the art that tetrasodium pyrophosphate was added to act as a dispersive agent. Other substances may be used (and have been used by me) for this purpose. For instance, sodium metaphosphate ($NaPO_3$) has been used for this purpose with satisfaction.

It will likewise be understood by those skilled in the art that the acidifying solution (the purpose of which is to convert lactose to galactose and glucose) may be composed of substances different from those mentioned in the above example. For instance, in another specific instance, I have successfully prepared the colloid of my invention by using a solution consisting of 150 grams of citric acid, 200 grams of common table salt and sufficient sodium carbonate to give a pH value of 3.0 to a solution of the above in 1500 cc. of water.

It will further be understood by those skilled in the art that the neutralizing solution may be composed of substances different from those mentioned in the above example. For instance, in another specific instance, I have successfully prepared the colloid of my invention by using a solution consisting of equal parts of dibasic sodium phosphate and of sodium carbonate. In another specific instance the neutralizing solution consisted of sodium carbonate and calcium carbonate in the ratio of 6:1.

As has previously been noted, concentrated or thickened skimmed milk may be used satisfactorily instead of skimmed milk powder. It proves advantageous that the water content of the skimmed milk be between approximately 50 and 75%, and the purpose of concentrating or thickening the skimmed milk is to reduce its water content.

It is advantageous that the pH of the mixture, following acidification, be approximately 6.2 and not in excess of this figure. The time of heating is varied depending on the pH of the acidifying solution, the longer period of heating being required when the pH is high. It is also advantageous that the pH of the finished colloid be approximately 6.8 to 7.0 and particularly so when the colloid is to be used in the preparation of oil emulsions.

It will be understood by those skilled in the art that the temperatures utilized in the preparation of the colloid of my invention are not high enough to cause coagulation of protein.

It should be pointed out when the colloid of my invention is prepared in laboratory quantities the amount of water used should be increased in order to facilitate handling. Further, roller process skimmed milk powder is not as fine as spray process skimmed milk powder, and the quantity of water necessary is generally greater when using the former.

As has already been noted, the colloid of my invention is particularly valuable in the preparation of oil and fat emulsions. It mixes with fats and oils in all proportions. For instance, emulsions may be prepared containing as little as 1 part of colloid and 99 parts of oily matter, or 99 parts of colloid and only 1 part of oily matter. A typical mixture useful as a spread for table use consists of 1 part colloid and 1 part sweet butter or salted butter, depending on taste. Another mixture suitable for table use as a spread consists of 2 parts colloid, 1 part butter, and 1 part cottonseed oil. The cottonseed oil may be substituted by olive oil, coconut oil, etc. A mixture comprising 1 part of lard and 1 part of colloid produces a shortening of value for cakes and other pastries. Other mixtures may be prepared to meet special requirements. For example, a small quantity of butter will give the emulsion a mild butter taste which meets with approval and is desired in may cases.

Such emulsions are prepared by heating the colloid to slightly above room temperature and then adding the oil or mixture of oils in small quantities and with continuous and energetic agitation. A smooth, brilliant, cream-like emulsion results. Needless to say, because of the nature of the principal raw material used in the preparation of the colloid of my invention, it possesses a high nutritive value.

It will be understood by those skilled in the art that the colloid of my invention must be kept at low temperature in order to prevent fermentation or putrefaction. It will be equally well understood that it may be preserved by the addition of suitable preservative. As examples, 2 parts per 1000 of nitre or of hydrogen peroxide, or ½ part per 1000 of sodium benzoate, would prove satisfactory as preservatives.

It will be also understood by those skilled in this art that the various chemical substances named, or their equivalents, are preferably added in solution in order to permit thorough dispersion. However, they could be added in powdered or finely divided form with equally satisfactory results, although in such cases care should be taken to bring about a particularly thorough mixing, preferably by mechanical means.

As a result of evaporation of water during the second heating stage (when the vessel is uncovered), the water content of the mass is reduced, and the final product contains approximately 65% of water.

It should be understood that while I have described my invention in detail in connection with certain specific embodiments, I do not intend that my invention be limited to, or circumscribed by, the particular details of operation described or proportions indicated.

What I claim is:

1. The method of manufacturing skimmed milk colloid which comprises mixing a dispersing agent selected from the group consisting of tetrasodium pyrophosphate and sodium metaphosphate with skimmed milk, heating the mixture at substantially 60 to 70° C. for approximately 2 hours in presence of an acid medium, and heating further at substantially 70 to 80° C. for approximately 2 hours in presence of a neutralizing medium.

2. The method of manufacturing skimmed milk colloid according to claim 1 in which the skimmed milk has a water content of between 50 and 75 precent by weight.

3. The method of manufacturing skimmed milk colloid according to claim 1 in which the mixture is held at a pH not greater than 6.3 during the first heating period and later neutralized to a pH of substantially from 6.7 to 7.0 during the second heating period.

4. The method of manufacturing skimmed milk colloid which comprises mixing skimmed milk powder with water, adding to the mixture a dispersing agent selected from the group consisting of tetrasodium pyrophosphate and sodium metaphosphate, heating at substantially 60 to 70° C. for approximately 2 hours in presence of an acid medium, and heating further at substantially 70 to 80° C. for approximately 2 hours in presence of a neutralizing medium.

5. The method of manufacturing skimmed milk colloid according to claim 4 in which the proportion of skimmed milk powder used is 2 parts by weight for every 5 parts by weight of water.

6. The method of manufacturing skimmed milk colloid according to claim 4 in which the mixture is held at a pH not greater than 6.3 during the first period of heating and neutralized to a pH of substantially from 6.7 to 7.0 during the second heating period.

7. In the method of manufacturing skimmed milk colloid the steps comprising: mixing 20 kilos of skimmed milk powder with 50 kilos of water; adding to the mixture approximately 1.25 kilos of tetrasodium pyrophosphate, 200 grams of common table salt and sufficient citric acid in 1.5 kilos of water to give a pH value of 3.0; heating the acidified mass at 60–65° C. for approximately 2 hours in a covered vessel; neutralizing with a solution comprising sufficient sodium carbonate dissolved in a minimum amount of water to give a final pH value of approximately 7.0; and heating at substantially 75–80° C. for approximately 2 hours in an open vessel.

8. The method of manufacturing skimmed milk colloid which comprises adding a dispersing agent selected from the group consisting of tetrasodium pyrophosphate and sodium metaphosphate to skimmed milk, acidifying the mixture to a pH of substantially 6.0 to 6.3 and heating at substantially 60–70° C. for approximately 2 hours, and thereafter heating at substantially 70–80° C. for an additional period of approximately 2 hours in presence of a neutralizing medium in quantity sufficient to increase the pH value to substantially between 6.7 and 7.

9. The method of manufacturing skimmed milk colloid which comprises adding water to skimmed milk powder to form a solution containing approximately from 50 to 75 percent water, adding a dispersing agent selected from the group consisting of tetrasodium pyrophosphate and sodium metaphosphate to said solution, acidifying the resulting mass to a pH of substantially 6.0 to 6.3 and heating for a period of approximately 2 hours at substantially 60–70° C., and thereafter heating for an additional period of approximately 2 hours at substantially 70–80° C. in presence of a neutralizing medium in quantity sufficient to increase the pH value to substantially between 6.7 and 7.

10. The method according to claim 1 in which the neutralizing medium consists of at least one substance selected from the group consisting of alkali metal carbonates, alkali metal phosphates, alkaline earth metal carbonates and alkaline earth metal phosphates.

11. The method according to claim 4 in which the neutralizing medium consists of at least one substance selected from the group consisting of alkali metal carbonates, alkali metal phosphates, alkaline earth metal carbonates and alkaline earth metal phosphates.

12. The method according to claim 8 in which the neutralizing medium consists of at least one substance selected from the group consisting of alkali metal carbonates, alkali metal phosphates, alkaline earth metal carbonates and alkaline earth metal phosphates.

13. The method according to claim 9 in which the neutralizing medium consists of at least one substance selected from the group consisting of alkali metal carbonates, alkali metal phosphates, alkaline earth metal carbonates and alkaline earth metal phosphates.

14. The method according to claim 1 in which the acidifying medium consists of at least one substance selected from the group consisting of sodium acid phosphate and citric acid.

15. The method according to claim 4 in which the acidifying medium consists of at least one substance selected from the group consisting of sodium acid phosphate and citric acid.

16. The method according to claim 8 in which the acidifying medium consists of at least one substance selected from the group consisting of sodium acid phosphate and citric acid.

17. The method according to claim 9 in which the acidifying medium consists of at least one substance selected from the group consisting of sodium acid phosphate and citric acid.

CLAYTON CLIFFORD CURRY.